United States Patent
Skelton et al.

(10) Patent No.: US 9,288,642 B2
(45) Date of Patent: *Mar. 15, 2016

(54) SYSTEM AND METHOD FOR COMMUNICATING USING TWO-WAY SMS

(71) Applicant: IDT Corporation, Newark, NJ (US)

(72) Inventors: Jeffrey S. Skelton, Perrineville, NJ (US); Benjamin Hirsch, Raanana (IL); Yitzchak Wurtzel, Ramat Beit Shemesh (IL)

(73) Assignee: IDT Corporation, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,590

(22) Filed: Feb. 18, 2014

(65) Prior Publication Data

US 2014/0162710 A1  Jun. 12, 2014

Related U.S. Application Data

(63) Continuation of application No. 13/287,895, filed on Nov. 2, 2011, now Pat. No. 8,655,393.

(51) Int. Cl.
| | |
|---|---|
| *H04W 4/00* | (2009.01) |
| *H04W 4/14* | (2009.01) |
| *H04L 29/12* | (2006.01) |
| *H04L 12/58* | (2006.01) |
| *H04L 12/14* | (2006.01) |
| *H04M 3/44* | (2006.01) |
| *H04W 8/26* | (2009.01) |
| *H04M 15/06* | (2006.01) |
| *H04M 15/00* | (2006.01) |
| *H04W 4/24* | (2009.01) |
| *H04M 3/42* | (2006.01) |
| *H04W 88/18* | (2009.01) |

(52) U.S. Cl.
CPC ............. *H04W 4/14* (2013.01); *H04L 12/1467* (2013.01); *H04L 12/1485* (2013.01); *H04L 51/28* (2013.01); *H04L 61/2596* (2013.01); *H04L 61/605* (2013.01); *H04M 3/44* (2013.01); *H04M 15/06* (2013.01); *H04M 15/43* (2013.01); *H04M 15/80* (2013.01); *H04M 15/8044* (2013.01); *H04M 15/8055* (2013.01); *H04M 15/8061* (2013.01); *H04W 4/24* (2013.01); *H04W 8/26* (2013.01); *H04L 51/38* (2013.01); *H04M 3/42382* (2013.01); *H04M 2215/28* (2013.01); *H04W 88/184* (2013.01)

(58) Field of Classification Search
CPC ........................... H04W 4/14; H04L 29/08108
See application file for complete search history.

(56) References Cited

U.S. PATENT DOCUMENTS

| | | | |
|---|---|---|---|
| 2007/0021101 A1* | 1/2007 | McCann et al. | 455/405 |
| 2010/0137009 A1* | 6/2010 | Jeong | 455/466 |
| 2011/0292930 A1* | 12/2011 | Mobin et al. | 370/352 |
| 2013/0028250 A1* | 1/2013 | Ma et al. | 370/352 |

* cited by examiner

*Primary Examiner* — Justin Lee
(74) *Attorney, Agent, or Firm* — Davidson Berquist Jackson & Gowdey, LLP

(57) ABSTRACT

The present invention is directed to a system and method for communicating using SMS messages between devices in different home networks, and, in one embodiment, to a method and system for assigning a local SMS number to a recipient device in a different home network such that a user is charged reduced communications costs.

10 Claims, 4 Drawing Sheets

SYSTEM AND METHOD FOR COMMUNICATING USING TWO-WAY SMS

FIELD OF INVENTION

The present invention is directed to a system and method for communicating using SMS messages between devices in different home networks, and, in one embodiment, to a method and system for assigning a local SMS number to a recipient device in a different home network such that a user is charged reduced communications costs.

DISCUSSION OF THE BACKGROUND

Short Message Service (SMS) is an increasingly popular method of communicating between cellular devices. Some plans charge per SMS/text message and other allow unlimited texting, but usually only within a particular geographical region (e.g., within the US or within a particular European country). However, texting outside of the cellular device's home geographical region can create significant expenditures on behalf of the user.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Over the past few years, Peer to Peer SMS messaging has been increasing. For many, text messaging is now an integral component of communication. However, due to costs associated with texting outside of one's local geographic area, users may be reluctant to use text messaging with those outside of their local geographic area.

It is possible to provide a method and system that will support prepaid, low cost messaging to select destinations. This enables two-way conversations between the customer and the destination number, using SMS, two-way voice, or both.

In an embodiment supporting text messaging, text messages are processed such that they are 'two way'. That is, a user is able to send SMS messages and the recipient is able to reply (e.g., to the temporary number assigned to the incoming text).

In a prepaid environment, the cost of international messaging should be paid for from the customer's balance. (The usage costs for two-way communication will always be deducted from the customer's prepaid balance, both for text and voice.)

By utilizing temporary telephone numbers to the conversation, the user experiences and utilizes a simpler interface that resembles standard (and familiar) experience of sending of direct SMS messages. The solution also can be scaled for voice services.

Figure 1:
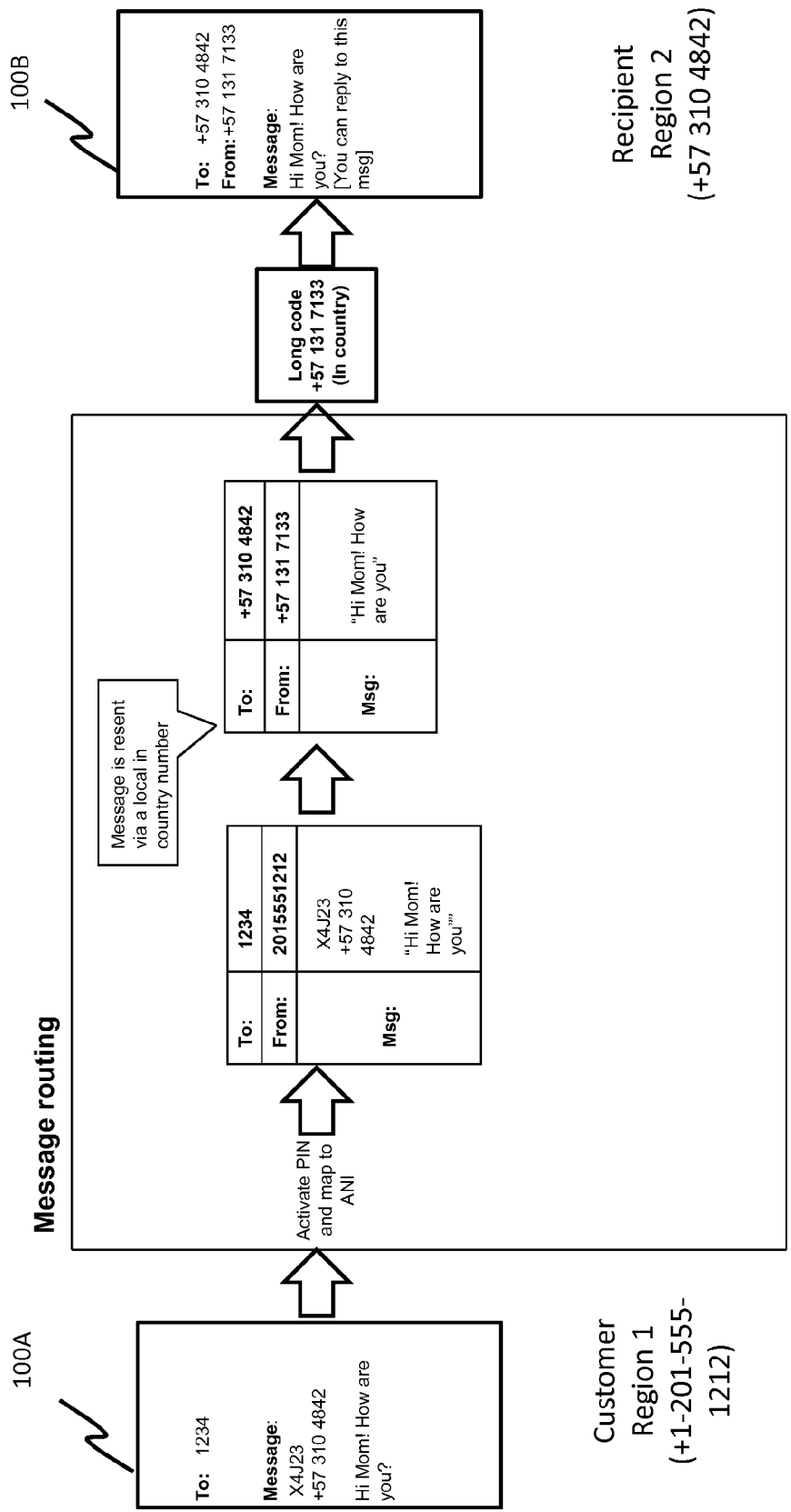
FIG. 1 is an exemplary illustration showing initial message routing for two phones using localized text messaging according to one aspect of the invention.

Turning to FIG. 1, two phones (100A and 100B) engage in a messaging session according to one aspect of the invention. At a beginning of the process, a customer in region 1 sends an SMS message to a "short number" (e.g., 1234) which identifies the platform for providing the services described herein. In the body of the message, the user provides an account number (e.g., X4J23) and/or Personal Identification Number (PIN) in addition to the destination phone number (e.g., +5 310 4842) that the remainder of the message is to be sent to. When the platform receives the message, it authenticates the user via the account number and/or PIN (and potentially the phone number from which the original message was sent). The platform then sends the message on to a telephony company at the local end (e.g., region 2) corresponding to the phone number of the recipient. The telephony company at the local end transmits the message so that it appears to be from a local number (e.g., +57 131 7133) that can be responded to like any other SMS in that region (e.g., region 2).

Figure 2:
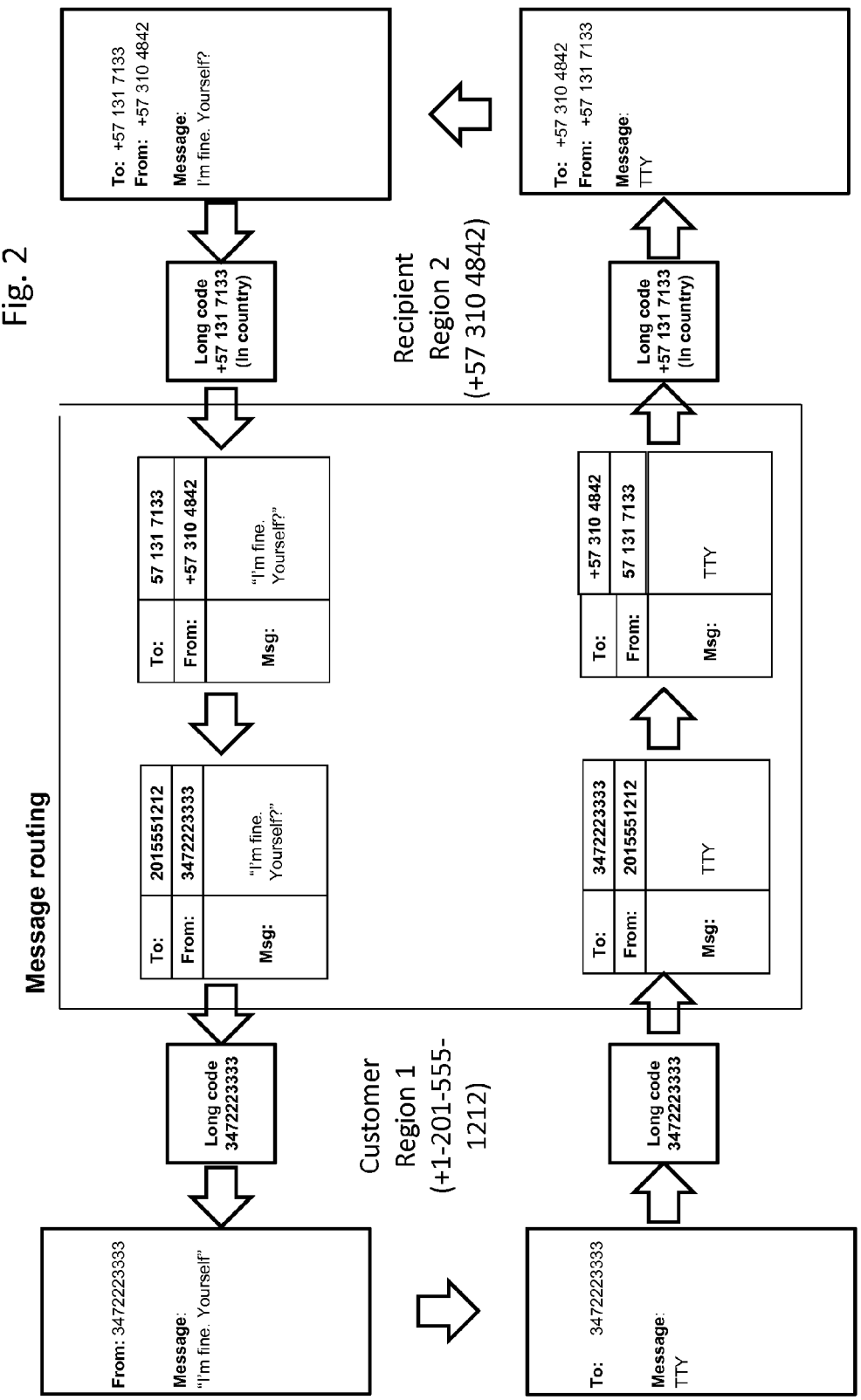
FIG. 2 is an exemplary illustration showing additional message routing for two phones using localized text messaging according to one aspect of the invention.

As shown in FIG. 2, since the message appears to be from a local number, when the recipient selects "reply" to the message, the recipient is not required to perform any special routing or data entry. The platform of the telephony company at the local end then performs the reverse number translation and forwards the message to the telephony company at the customer's local side (e.g., region 1). The telephony company at the customer's local side makes the message appear to come from a number local to the customer's local side (e.g., 3472223333) so that the customer may then utilize the local number for all future replies.

The local numbers generated/selected for the local telephony replies (e.g., +57 131 7133 and 347222333) can both be generated/selected by the platform at the customer's local end or the platform at the recipient's end, or one phone number can be generated at each end. The two platforms may communicate between each other using either direct communication or via packet-switched communications (e.g., over the Internet), using encrypted or unencrypted communications protocols. In addition to the exchange of messaging information, the platforms may also exchange other information (e.g., billing information for processed messages or the assignment of local numbers to specified conversations).

Figure 3:
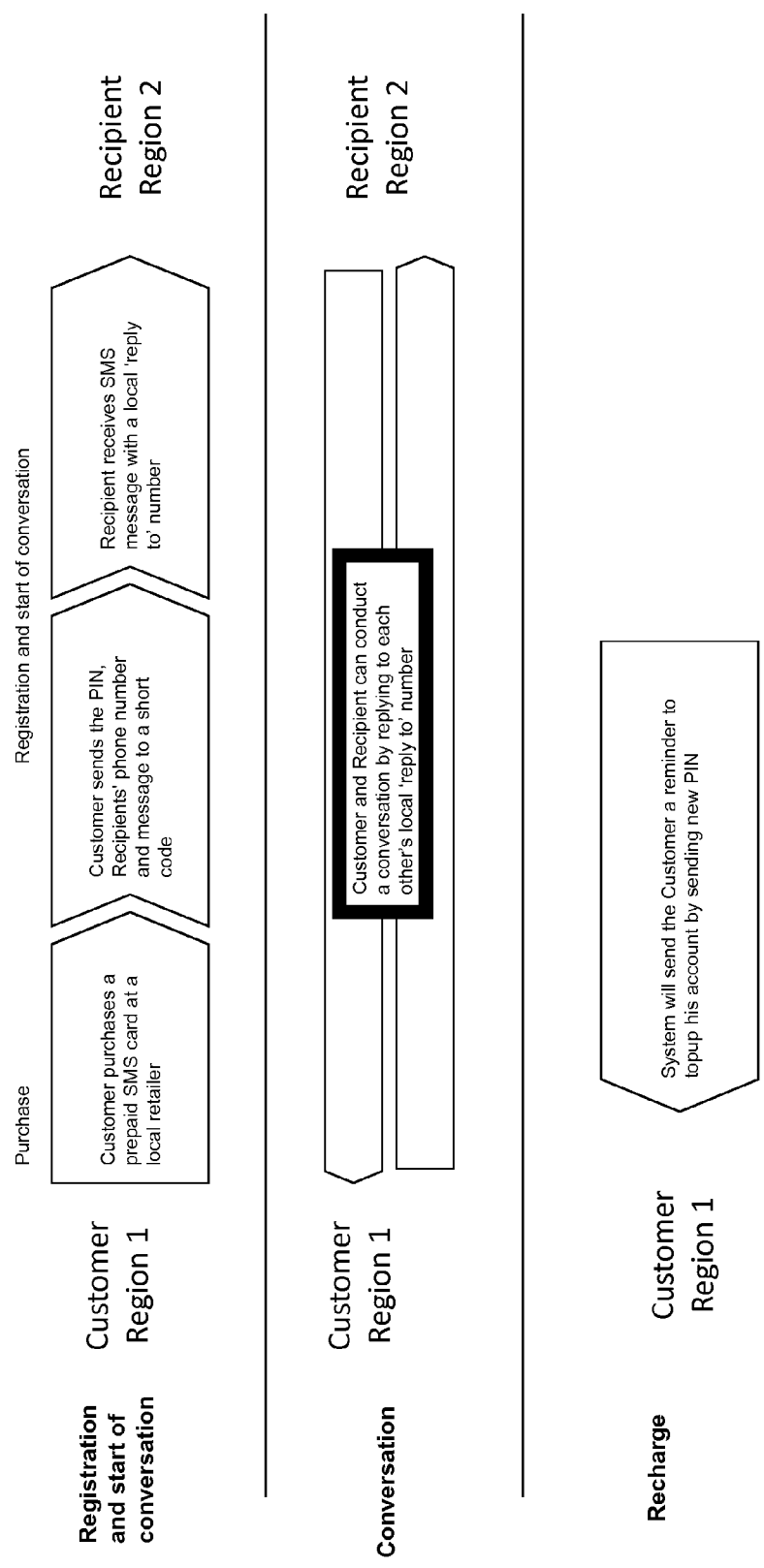
FIG. 3 is a flow diagram illustrating exemplary processes of (1) registering and starting a conversation, (2) conversing and (3) receiving of a reminder about recharging the account used to communicate between phones 100A and 100B of FIG. 1.

FIG. 3 provides a flow diagram showing the registration and start of conversation process. As shown therein, in one embodiment, the customer purchases a prepaid SMS card at a local retailer. FIG. 3 also shows an exemplary conversation (e.g., between phones 100A and 100B of FIG. 1). FIG. 3 also shows that the customer may receive a text message or other message (e.g., a "robo-call") reminding the user to top-up his/her account by sending a new PIN or otherwise recharging the account.

Figure 4:
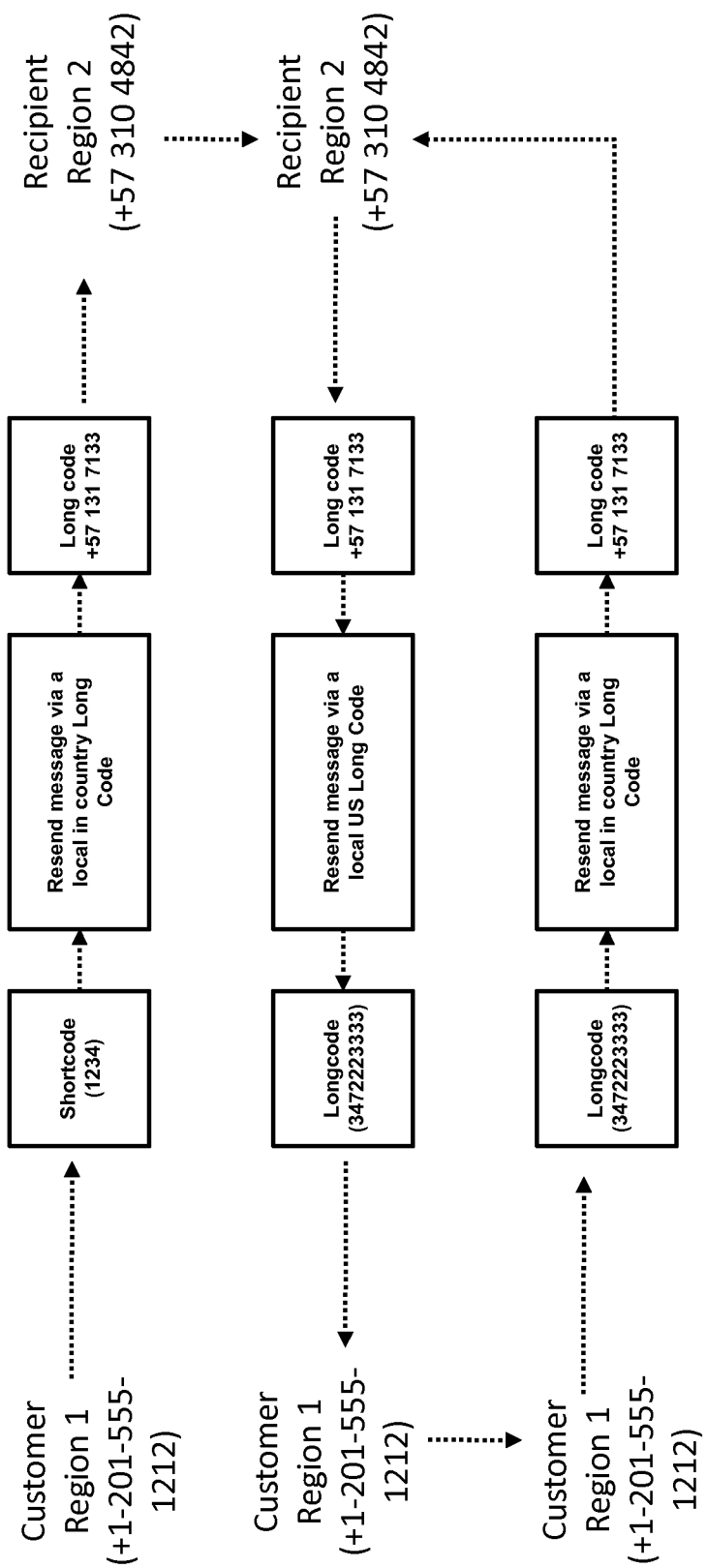
FIG. 4 is a flow diagram illustrating exemplary processes of initiating communication and conversing/communicating for the phones of FIG. 1.

FIG. 4 is a combined data flow diagram showing communication initiation and an ongoing conversation, similar to those described above with respect to FIGS. 1 and 2.

As would be appreciated by one of ordinary skill in the art, a system for providing the message routing described herein would include: telephony and/or computer interfaces for receiving the SMS messages routed to the short numbers in the local geographic areas and a programmed or programmable system for processing the messages (including incoming numbers, outgoing numbers, account codes and/or PINs). The programmed or programmable system may be implemented as one or more of (1) a general purpose computer configured with special-purpose software to control the platform(s) as described herein and (2) specialized hardware configured to control the platform(s) as described herein. Computers used herein may be single or multi-processor computers whose functions are controlled by the computer instructions stored in the memory or memories of the computer.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computerized telephone system comprising:
a receiver configured to receive at a first local platform telephone number, from a first local telephony device, a first remote telephone number of a first remote telephony device and a first text message for the first remote telephony device;
a controller (1) configured to verify that an account of the first local telephony device will allow transmission of a portion of the first text message to the first remote telephony device and (2) transmit the portion of the first text message to a remote telephony platform that will forward the portion of the first text message to the first remote telephony device; and
a transmitter configured to transmit to the first local telephony device a first local telephone number different than the first local platform telephone number and different from the first remote telephone number for use in communication of subsequent text messages from the first local telephony device to the first remote telephony device and text messages from the first remote telephony device to the first local telephony device,
wherein the receiver is further configured to receive from the first local telephony device a second text message to be delivered to the first remote telephone number but addressed to the first local telephone number,
wherein the controller is further configured to transmit the second text message to the remote telephony platform for delivery to the first remote telephony device,
wherein the transmitter is further configured to receive from the first remote telephony device a third text message including the first remote telephone number,
wherein the transmitter is further configured to replace in the third text message the first remote telephone number with the first local telephone number before delivering the third text message to the first local telephony device.

2. The system as claimed in claim 1, wherein the controller configured to verify that the account of the first local telephony device will allow transmission of the portion of the first text message to the first remote telephony device comprises a controller configured to verify that the account has a sufficient prepaid balance to allow transmission of the portion of the first text message to the first remote telephony device.

3. The system as claimed in claim 1, wherein the controller configured to verify that the account of the first local telephony device will allow transmission of the portion of the first text message to the first remote telephony device comprises a controller configured to verify that an authorization code was received from the first local telephony device.

4. The system as claimed in claim 1, wherein the controller configured to verify that the account of the first local telephony device will allow transmission of the portion of the first text message to the first remote telephony device comprises a controller configured to verify that the account of the first local telephony device has a sufficient prepaid balance to allow transmission of the second text message to the first remote telephony device as a precondition to transmitting the second text message.

5. The system as claimed in claim 1, wherein the first text message includes an account number associated with the first local telephony device and wherein the portion of the first text message transmitted to the remote telephony platform to be forwarded to the first remote telephony device does not include the account number.

6. The system as claimed in claim 1, wherein the first text message includes a personal identification number (PIN) associated with the first local telephony device and wherein the portion of the first text message transmitted to the remote telephony platform to be forwarded to the first remote telephony device does not include the PIN.

7. The system as claimed in claim 1, wherein the controller configured to verify that the account of the first local telephony device will allow transmission of the portion of the first text message to the first remote telephony device comprises a controller configured to verify a phone number of the first local telephony device from which the receiver received the first text message.

8. The system as claimed in claim 1, wherein the transmitter further transmits to the first local telephony device a reminder to increase a prepaid balance of the account associated with the first local telephony device.

9. The system as claimed in claim 1, wherein the controller communicates with the remote telephony platform using packet-switched communication.

10. The system as claimed in claim 1, wherein the controller communicates with the remote telephony platform using encrypted, packet-switched communication.

* * * * *